(12) United States Patent
Schneider et al.

(10) Patent No.: US 9,994,448 B2
(45) Date of Patent: Jun. 12, 2018

(54) IODINE EXTRACTION PROCESSES

(75) Inventors: Charles A. Schneider, Union, KY (US); David J. Schneider, Union, KY (US)

(73) Assignee: IOFINA CHEMICAL, INC., Covington, KY (US)

( * ) Notice: Subject to any disclaimer, the term of this patent is extended or adjusted under 35 U.S.C. 154(b) by 770 days.

(21) Appl. No.: 12/617,376

(22) Filed: Nov. 12, 2009

(65) Prior Publication Data

US 2011/0108486 A1   May 12, 2011

(51) Int. Cl.
| | |
|---|---|
| *B01D 15/04* | (2006.01) |
| *C01B 7/14* | (2006.01) |
| *C02F 1/28* | (2006.01) |
| *C02F 1/66* | (2006.01) |
| *C02F 1/72* | (2006.01) |
| *C02F 101/12* | (2006.01) |

(52) U.S. Cl.
CPC .............. *C01B 7/14* (2013.01); *C02F 1/283* (2013.01); *C02F 1/66* (2013.01); *C02F 1/722* (2013.01); *C02F 2101/12* (2013.01)

(58) Field of Classification Search
CPC ........ C01B 7/14; C01B 7/135; B01J 20/3416; B01J 20/22; C02F 1/283; C02F 1/722; C02F 1/66; C02F 2101/12; C02F 2103/08
USPC ............ 423/481, 482, 499.1, 500, 503, 507; 502/20–22
See application file for complete search history.

(56) References Cited

U.S. PATENT DOCUMENTS

| | | | |
|---|---|---|---|
| 1,774,882 A | 9/1930 | Girvin | |
| 3,455,820 A * | 7/1969 | Hager et al. | ............... 210/666 |
| 4,201,665 A | 5/1980 | Chang et al. | |
| 4,295,967 A * | 10/1981 | Kurima et al. | ............... 210/189 |
| 4,461,711 A | 7/1984 | Behrens | |
| 4,647,700 A * | 3/1987 | Georges | ....................... 564/412 |
| 5,503,873 A * | 4/1996 | Gavalas et al. | ............. 427/228 |
| 7,442,363 B2 * | 10/2008 | Takahashi et al. | ........ 423/648.1 |
| 2008/0083666 A1 * | 4/2008 | Brown et al. | ................. 210/202 |

OTHER PUBLICATIONS

Meguro et al, "Application of the Dubinin-Radushkevich Equation to Iodine Adsorption by Activated Carbons from Aqueous Solution", Carbon, vol. 23, No. 2, pp. 137-140, 1985.*

"Groundwater Information Sheet—Salinity", pp. 1-7, taken from http://www.waterboards.ca.gov/gama/docs/coc_salinity.pdf, Mar. 2010.*

English translation of JP 51-116,196, Oct. 1976.*

XP-002611990, Phyllis A. Lyday, Iodine and Iodine Compounds, U.S. Bureau of Mines, Washington, DC, Jun. 15, 2000, pp. 1-12, retrieved from the internet: URL:http://onlinelibrary.wiley.com/doi/10.1002/14356007.a14_381/pdf retrieved on Nov. 30, 2010.

(Continued)

*Primary Examiner* — Ngoc-Yen Nguyen
(74) *Attorney, Agent, or Firm* — Fay Sharpe LLP

(57) ABSTRACT

Processes for extracting iodine from an aqueous solution, such as brine, are disclosed. Activated coconut carbon particles are mixed with the solution to adsorb iodide through pores in the activated carbon particles. The activated carbon particles are then treated with sulfur dioxide gas and water to form hydrogen iodide. The hydrogen iodide is then reacted with chloride to obtain elemental iodine ($I_2$).

11 Claims, 2 Drawing Sheets

(56) References Cited

OTHER PUBLICATIONS

PCT International Search Report PCT/ISA/210, PCT/US2009/064222, 6 pages, dated Feb. 2011.
XP-002593689, F.S. Baker et al., Carbon Activated, Kirk-Othmer Encyclopedia of Chemical Technology, Aug. 15, 2003, pp. 741-761, vol. 4, retrieved from the internet: URL:http://mrw.interscience.wiley.com/emrw/9780471238966/kirk/article/actibake.a01/current/pdf , retrieved on Jul. 22, 2010.
Annex to Form PCT/ISA/206, Communication Relating to the Results of the Partial International Search, PCT/US2009/064222, 2 pages, dated Feb. 2011.

* cited by examiner

IODINE EXTRACTION PROCESSES

BACKGROUND

The present disclosure relates to processes for recovering iodine from an aqueous solution, such as brine. Several different aspects and embodiments are described. Such processes are particularly helpful in extracting iodine while minimizing the safety and disposal problems associated with other processes.

Iodine and its compounds are useful in many applications, including medicine, photography, catalysts, bactericides, disinfectants, pharmaceuticals, fungicides, and dyes. Iodine is a rare element and is mainly produced outside the United States, so the U.S. is a major net importer of iodine. Elemental iodine or diatomic iodine ($I_2$) has a brown/purple color and is commercially valuable, but does not generally exist in its free state in nature. Instead, iodine exists as ions in various oxidation states, such as iodide ($I^{1-}$).

Iodine ions typically do not occur in a high enough concentration to make recovering elemental iodine economically feasible from conventional sources such as seawater. However, natural brines, i.e. salt solutions associated with petroleum deposits and underground water, typically contain about 100 ppm of iodine, which is about 2,000 times higher than the concentration of iodine in regular seawater. Hence, natural brine has become a commercially viable source for iodine extraction.

In this regard, a major source of iodine today is brine produced as a byproduct of natural gas extraction. Typically, a mixture comprising brine and natural gas is obtained from a natural gas well. The iodine exists in various oxidation states, e.g. −1, +1, +5, and +7. Most of the iodine is in the form of iodide ions ($I^{1-}$) which are white in color. When one electron is pulled off of the iodide ions, elemental iodine is formed.

Some processes for extracting iodine from aqueous solutions are known. The "blow-out" process is a conventional process using air, gas, and heat. Initially, chlorine ($Cl_2$) is mixed with the brine, causing oxidation and resulting in the formation of elemental iodine and hydrochloric acid. The $I_2$ is extracted from the brine using a counter-current air stream, and then separated out and recovered. However, the "blow-out" process results in large quantities of an acidified solution having a low pH, typically from 1 to 3. Such low pH levels pose serious safety risks and create disposal problems. A base, such as sodium hydroxide, must be introduced to neutralize the acidified brine solution before it may be released into the environment.

Additional processes for extracting iodine from an aqueous solution, such as brine, which do not require lowering the pH of the brine to the levels of the processes discussed above, are desirable.

BRIEF DESCRIPTION

The present disclosure relates to apparatuses and processes for recovering iodine from aqueous solutions containing iodide, such as brine. These processes are particularly advantageous because they are more economical and are more flexible for changing the physical form of the final iodine product.

In some embodiments, the process comprises (i) contacting the solution with granular activated carbon particles comprising pores to adsorb iodide into the pores, (ii) treating the iodide containing granular activated carbon particles with sulfur dioxide gas to form hydrogen iodide, and (iii) then picking a choice for the physical form of the recovered iodine, for example by reacting the hydrogen iodide with an oxidant, such as sodium hypochlorite or hydrogen peroxide, to form diatomic iodine. The diatomic iodine may be filtered out in crystalline form in some embodiments. Alternatively, the iodine could remain as hydriodic acid, or be neutralized to sodium iodide, and used as such for incorporation into a derivative depending on the intended end use.

In a preferred embodiment, the granular activated carbon particles are coconut carbon particles.

In some embodiments, the pH of the aqueous solution is maintained at from about 5.5 to about 6.5 as it contacts the granular activated carbon particles, as compared to a much more acidic pH in conventional processes.

The pores of the granular activated carbon particles may be micropores, mesopores, macropores, or mixtures thereof. In some embodiments the pores have diameters of less than about 40 nanometers.

Also disclosed are processes for recovering elemental iodine ($I_2$) from an aqueous solution containing iodine ions, comprising: passing the aqueous solution through a vessel containing granular activated carbon particles to adsorb the iodine contained in the aqueous solution. Following the adsorption process, the adsorbed iodine can be removed by exposing the iodine ion containing granular activated carbon particles to sulfur dioxide gas and water. The resulting chemical reaction forms a reducing solution which contains the iodine in the form of hydrogen iodide. The recovered iodine can now be used in one of many ways including reacting the hydrogen iodide with an oxidant reactant to obtain elemental iodine. The elemental iodine can be separated from the oxidized solution. The granular activated carbon particles can also be recycled after the reducing solution has been applied for subsequent recovery of iodine from additional aqueous solution.

Also disclosed are various processes for recovering elemental iodine ($I_2$) from brine, comprising: exposing fixed bed granular activated coconut carbon particles with the brine to adsorb iodide in the brine; exposing the iodide containing fixed bed granular activated coconut carbon particles to sulfur dioxide gas and water to form hydrogen iodide; and oxidizing the hydrogen iodide to obtain elemental iodine.

These and other non-limiting aspects of the present disclosure are more particularly described below.

BRIEF DESCRIPTION OF THE DRAWINGS

The following is a brief description of the drawings, which are presented for the purpose of illustrating the exemplary embodiments disclosed herein and not for the purpose of limiting the same.

DETAILED DESCRIPTION

Figure 1:
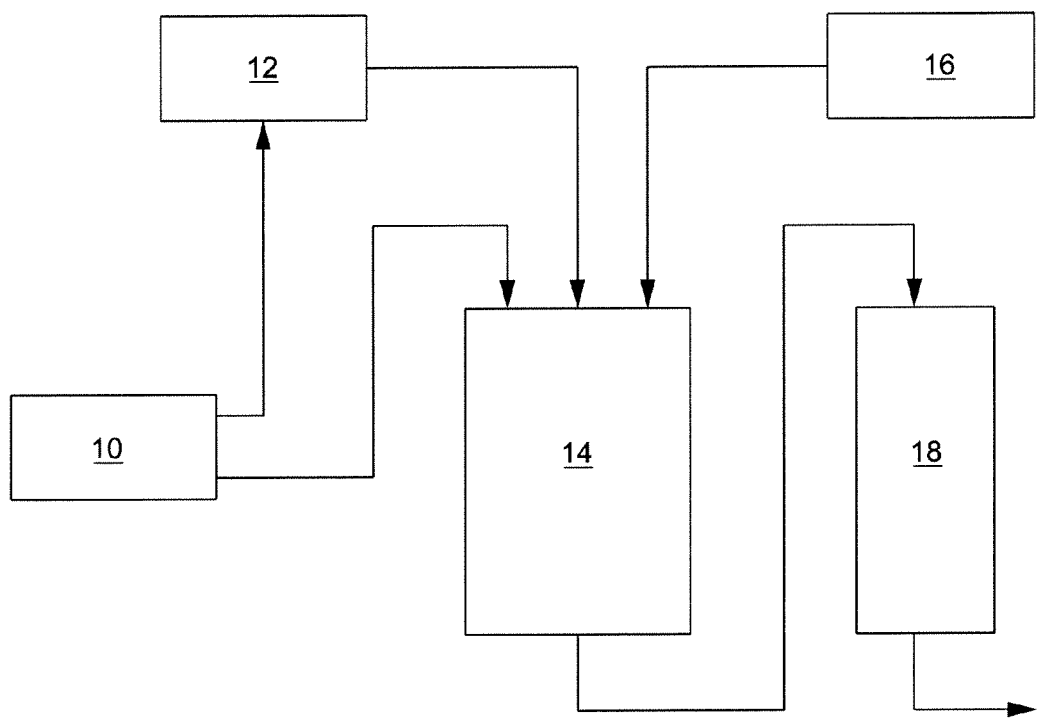
FIG. 1 is a flowchart showing a first exemplary method and/or apparatus useful in the present disclosure.

A more complete understanding of the components, processes, and apparatuses disclosed herein can be obtained by reference to the accompanying figures. These figures are merely schematic representations based on convenience and the ease of demonstrating the present development and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The processes of the present disclosure relate to extracting iodine ions for commercial use. Generally, iodide ions contained in brine are oxidized to elemental iodine. The brine, containing elemental iodine, is then contacted with granular activated carbon particles in a fixed bed to adsorb the iodine onto the granular activated carbon particles in the fixed bed. Generally, the oxidized brine solution is passed through the fixed bed granular activated carbon particles, which adsorb the available iodine onto the granular activated carbon particles. The granular activated carbon particles are then treated with sulfur dioxide gas and water to remove the iodine from the activated carbon particles. The resulting products are hydrogen iodide, sulfuric acid, and the re-activated carbon particle bed. This solution of hydrogen iodide and sulfuric acid is then oxidized to obtain elemental iodine, which can be separated and recovered, or modified into a physical form that is acceptable for a given end use.

Granular activated carbon particles are used in the present processes. Activated carbon may be produced from any carbon-rich material such as coconut shell, wood, coal, peat, eucalyptus, saw dust, rice husk, and lignite. Processes for activating carbon by increasing its surface area are known. Adsorption capacity increases as surface area increases. In the steam activation process, the carbon-rich material is converted to shell charcoal by a carbonization process. Next, the shell charcoal is activated by reaction with steam. A temperature of from about 900° C. to about 1100° C. is typically used during the second step. Alternatively, in a chemical activation process, a carbon-rich material may be impregnated with an acid, strong base, or salt and then carbonized at a lower temperature. The carbon particles of the present disclosure are granular and used in a fixed bed configuration. The fixed bed allows for ease of handling, ease of treatment, insures continuous flow, and ease of reactivation. The fixed bed is not disturbed during many cycles of adsorption and allows for ease of filling, ease of stripping, and ease of change from the fill cycle to the stripping cycle.

In particular embodiments, the granular activated carbon particles are coconut carbon particles. It has been discovered that coconut carbon particles are more efficient/effective than activated carbon produced from wood or coal. Coconut carbon particles have a superior hardness compared to other activated carbon particles. In addition, without being bound by theory, it is believed that coconut carbon particles possess more micropores than other activated carbon particles. Micropores are pores with a diameter of less than 2 nanometers. In contrast, mesopores have a diameter of from 2 to 25 nanometers and macropores have a diameter of greater than 25 nanometers. It is believed that the small size of the pores in the coconut carbon particles prevents the adsorption of larger molecules that would otherwise lower the efficiency of the activated carbon particles. This size discrimination based on the pore size also improves the yield of the overall process. The "iodine value" is referred to as a measure of the efficiency of the carbon, and coconut carbon particles have higher iodine values than other activated carbons.

If desired, the brine may first be oxidized to convert iodine ions into elemental iodine ($I_2$) before the brine is passed through the granular activated carbon. Any oxidant may be added to the brine. Exemplary oxidants include chlorine, sodium hypochlorite, and hydrogen peroxide.

The granular activated carbon particles are allowed to be intimately exposed to the brine solution. For example, the granular activated carbon particles may be present as a fixed bed that is bound into a column or contained in an enclosed container or a bed. The brine solution is passed through the column or container that contains the fixed bed of granular activated carbon particles. The granular activated carbon particles then adsorb iodine from the brine into its pores. The detailed physical chemistry is not clearly understood, for example the exact percentage of iodide ion vs. elemental iodine, and is not relevant here. The temperature is not critical, although the brine is typically a few degrees below ambient temperature because natural brine coming out of the ground is cold. The brine may be treated with an oxidant, such as chlorine or sodium hypochlorite or hydrogen peroxide, to oxidize iodine ions into elemental iodine.

The pH of the brine solution may be controlled during the process. In some embodiments, the pH is kept between about 5.5 and about 6.5 while the brine solution is contacted with the fixed bed of granular activated carbon particles. Keeping the pH within this range inhibits higher oxidative states.

Upon saturation of the granular activated carbon particles with iodine, the brine is drained or blown free from the activated carbon particle bed in the column or container. The granular activated carbon particles are then treated with sulfur dioxide gas ($SO_2$) and water ($H_2O$) to extract the iodine. The carbon container and the granular carbon bed contained therein are generally left intact. Plain water as low in foreign ions as possible (e.g. water purified through reverse osmosis) is percolated or circulated through the carbon. Typically, the amount of water sent through the column is about four times the weight of the carbon particles being extracted. For example, if 500 pounds of carbon particles are being extracted, 2000 lbs of water is used to extract the iodine. $SO_2$ as a gas is then added to the water in a continuous manner. This treatment removes the iodine from the pores of the activated carbon particles. The resulting products are hydrogen iodide (HI) and sulfuric acid ($H_2SO_4$). Typically, a pound of carbon will have adsorbed about a pound of iodine. This allows the stoichiometry of the $SO_2$ to be more precise, rather than simply relying on an excess of $SO_2$ to achieve complete removal of the iodine.

The reaction is displayed as a color show: water initially passing into the carbon column does not have color because it has excess reducing agent ($SO_2$) while water passing out of the carbon column is colored by the extracted iodine. The endpoint is thus also visible: when water passing out of the carbon column is clear (i.e. no more iodine is being removed), the extraction of iodine from the activated carbon columns is complete. During the extraction of iodine from the activated carbon particles, the temperature will rise slightly, e.g. to between 30 and 40° C., depending on reaction conditions, flow rate of recycle, time set for completion, temperature of inlet water, cooling from radiation in the equipment, etc. Generally, the $SO_2$ may be charged into the column for a period of about 2 to about 4 hours, followed by a recycle that can take about 2 hours.

The granular activated carbon particles now have vacant pores and they can be recycled for continued use. The hydrogen iodide and sulfuric acid form a reducing solution, and this solution can be maintained as desired. Typically, the HI is present in the amount of from 15 to 25 weight percent of the reducing solution and the $H_2SO_4$ is present in the amount of from about 7 to about 13 weight percent of the reducing solution. The overall chemical reaction for the iodine extraction is shown below:

$$(I_2 \text{ or } 2I^{1-}) + SO_2 + 2H_2O \rightarrow 2HI + H_2SO_4$$

The hydrogen iodide can then be oxidized to form elemental iodine, usually in the form of crystals. The oxidizing reactant or oxidant can be, for example, chlorine or chloride, sodium hypochlorite, or hydrogen peroxide, as shown in the following reactions:

$$2HI + (Cl_2 \text{ or } 2Cl^{1-}) \rightarrow I_2 + 2HCl$$

$$2HI + 2NaClO \rightarrow I_2 + 2NaCl + H_2O$$

$$2HI + H_2O_2 \rightarrow I_2 + 2H_2O$$

A preferred oxidizing solution is aqueous hydrogen peroxide, ideally in a 35-50% (by weight) concentration. The oxidizing solution is typically added very slowly, for example over a period of at least 1 hour, with cooling. The oxidizing solution should also be concentrated and added without dilution. The addition is performed, in embodiments, at temperatures of about 10° C. and is preferably done with good agitation, for example agitating for 1 to 2 hours while maintaining the low temperature.

Finally, the elemental iodine can be separated, for example by filtration.

The present processes offer several advantages. First, it is cheaper, more efficient, faster, and easier to extract iodine using a fixed bed granular carbon adsorption column than using an anion exchange column. Granular carbon is extremely stable compared to an anion exchange resin. The use of $SO_2$ allows for the use of only stoichiometric amounts of extractant, rather than massive excesses of caustic. The use of $SO_2$ also allows the stripping conditions to be more easily managed. In particular, when the extraction takes place at room temperature or below, the stripping kinetics are much more aggressive than the kinetics using caustic extract. While elemental iodine is only slightly soluble in water, the addition of iodide ion substantially increases its solubility. Thus, as the stripping proceeds, the iodine not yet stripped becomes more soluble due to the generated hydrogen iodide, and therefore increased positive feedback occurs in the iodine/$SO_2$ reaction dynamics. Stripping an ion exchange resin requires caustic that is strong and is warm (i.e. an elevated temperature), whereas stripping the granular activated carbon can be done with water and $SO_2$ at room temperature and mild conditions.

The present processes also allow iodine to be offered in a variety of ways based on the manner in which the iodine is organized. For example, if the sulfuric acid does not conflict with the desired use of the recovered iodine, one could use the iodine directly as the hydriodic acid (HI) and which is the form that is presented at the time of stripping. If the sulfuric acid does present a problem, one could add more solid iodine, form a "heavy" layer of hydrogen iodide/iodine and a "lighter" aqueous sulfuric acid layer, and then separate the two layers.

Alternatively, the solution of hydrogen iodide and sulfuric acid could be neutralized to obtain a "non-hazardous" sodium iodide/sodium sulfate solution for transport or use in a chemical reaction that presents no significant hazard in handling, use, transport, and/or government regulatory mandates. If desired, the sodium sulfate could be removed to obtain the sodium iodide. If the concentration of the neutralized solution is not strong enough, the neutralized extract can be cooled to precipitate the sodium sulfate and allow for its removal by, e.g., filtering to concentrate the iodine remaining in the solution. One could also strip off some of the water solvent and achieve stable solutions of sodium iodide in concentrations up to 50 wt % sodium iodide. Finally, the hydrogen iodide can be oxidized into elemental iodine. This allows the final product containing iodine to be tailored to the desired needs of the end user.

The use of $SO_2$ is helpful because exact stoichiometry can be used, rather than large excesses of caustic.

FIG. 1 is a flowchart showing an exemplary method of the present disclosure. Brine is transferred from a brine source 10 to an electrolytic cell 12 and a reactor 14. The transfer may occur using an aqueous solution under pressure, such as when the brine source 10 is an artesian well, or the brine may be pumped. Preferably, the brine is filtered to remove dirt particles and other filterable impurities before reaching the electrolytic cell 12 and reactor 14.

The electrolytic cell 12 receives brine from the brine source 10. Sodium chloride and water in the brine react in the electrolytic cell to produce sodium hypochlorite, commonly known as bleach and useful here as an oxidant, according to the following equations:

$$2NaCl + 2H_2O \rightarrow Cl_2 + H_2 + 2NaOH$$

$$Cl_2 + 2OH^{1-} \rightarrow Cl^{1-} + ClO^{1-} + H_2O$$

The amount of NaOCl produced is controlled by a combination of the amperage of the electrolytic cell and the flow rate of brine through the electrolytic cell 12.

Three different fluids then enter the reactor 14: brine, NaOCl, and acid 16. Acid is provided by the pH unit 16, which is a tank containing acid with a pump to transfer the acid to the reactor 14. In embodiments, the acid is hydrochloric acid or sulfuric acid. Brine from the brine source 10 and brine containing NaOCl from the electrolytic cell 12 combine in the reactor 14. Iodide in brine is oxidized by NaOCl to produce elemental iodine according to the following equation:

$$ClO^{1-} + 2H^{1+} + 2I^{1-} \rightarrow Cl^{1-} + H_2O + I_2$$

Brine containing elemental iodine is transferred from the reactor 14 to the fixed bed 18 of granular activated carbon particles. The brine is passed through the fixed bed granular activated carbon particles, which adsorb the iodine onto the granular activated carbon particles.

Figure 2:
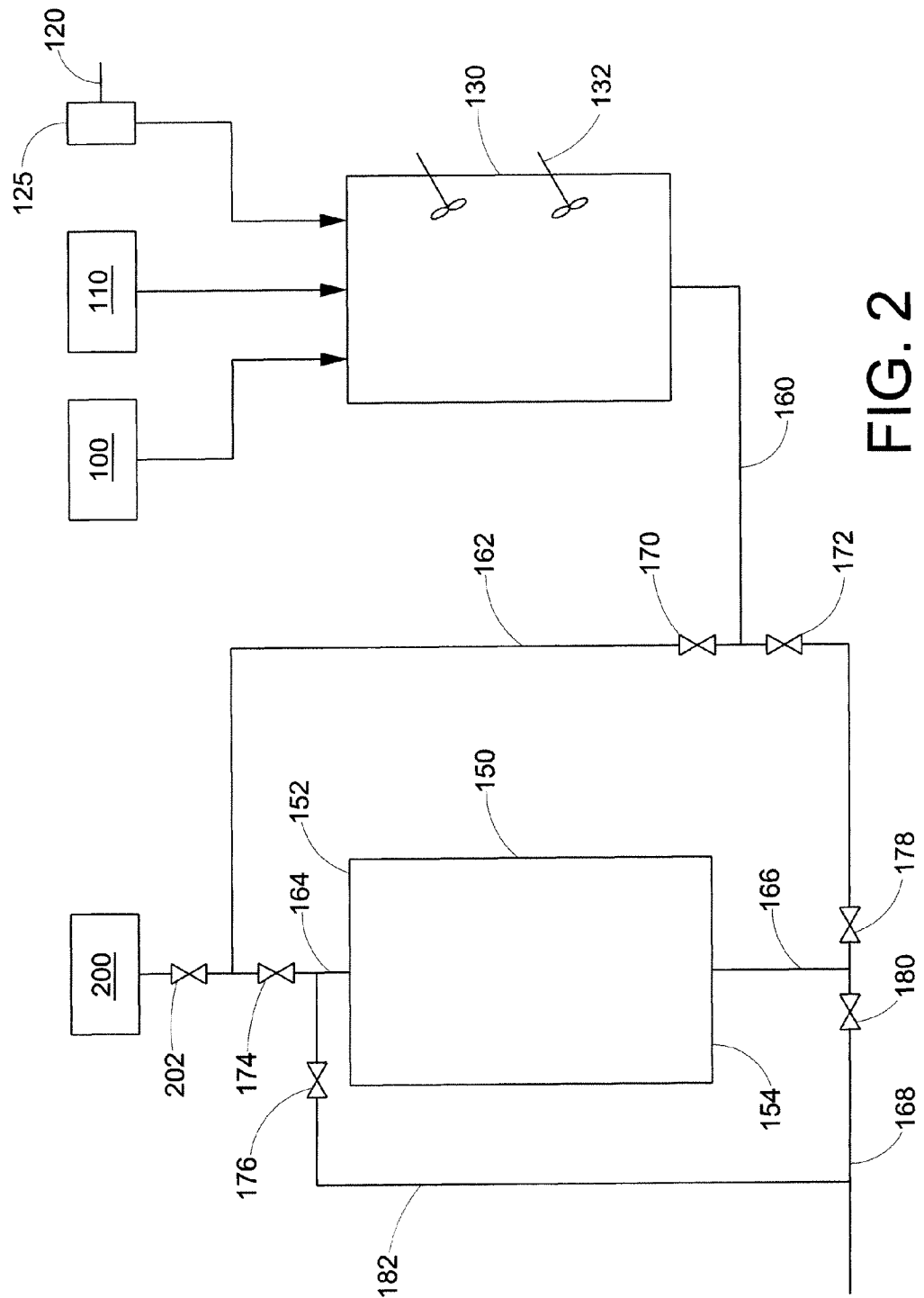
FIG. 2 is a flowchart showing a second exemplary method and/or apparatus useful in the present disclosure.

FIG. 2 is a diagram of a second exemplary method of the present disclosure. Here, an oxidant is provided from a tank or external feed 100. Acid 110 is also provided from a tank or external feed. Brine 120 passes through a filter 125 before being fed, along with the acid and oxidant, into a closed tank 130 containing an agitator 132. The brine, acid, and oxidant are subsequently mixed by agitation to form elemental iodine in the brine. The brine is then sent by feed line 160 to a fixed bed 150.

Typically, foreign material is filtered out of the brine from the brine source before the brine is processed. However, it is impossible to remove 100% of the foreign material, particular very fine iron based hydroxides and hydroxide/halide complexes. As the pH of the brine is adjusted and iodine ions are oxidized to elemental iodine, these iron hydroxides and complexes (i.e. breakthrough contaminants) will also react and can precipitate into iron-based solids. These breakthrough contaminants are naturally trapped in the fixed bed of granular activated carbon particles and will continue to react with the $SO_2$/water as well. Thus, it is generally desirable to remove these break through contaminants in order to prevent contamination of the iodine as it is stripped from the fixed bed of granular activated carbon particles.

The breakthrough contaminants can be removed by means of a backwash step. Typically, the brine containing elemental iodine travels through feed lines 160, 162, and 164 to feed brine at the top 152 of the fixed bed 150. In this arrangement, any solid breakthrough contaminants would precipitate at the top 152 of the fixed bed. Iodine is adsorbed, and the waste brine, now having a reduced concentration of iodine, flows through feed lines 166 and 168 at the bottom 154 of the fixed bed to be disposed of. In this arrangement, valves 170, 174, and 180 are open, while valves 172, 176, and 178 are closed.

In the backwash step, valves 170, 174, and 180 are closed, while valves 172, 176, and 178 are opened. This causes the brine containing elemental iodine to travel through feed lines 172 and 166 to feed the brine at the bottom 154 of the fixed bed 150. Pressure forces the brine up through the fixed bed 150. The waste brine, now having a reduced concentration of iodine, then washes the solid breakthrough contaminants at the top 152 of the fixed bed out of waste line 182 to remove the solid contaminants from the fixed bed 150.

It should be noted that the backwash has no effect on the adsorption of iodine from the brine because there is an adsorption gradient in the fixed bed 150. Because the fixed bed is generally being fed from the top 152, the carbon particles at the top of the fixed bed become saturated with iodine before the carbon particles at the bottom of the fixed bed become saturated. Thus, during the backwash step, the iodine in the brine is still adsorbed by the non-saturated carbon particles at the bottom of the fixed bed. In other words, valuable iodine is not also washed out with the solid contaminants and wasted.

The backwash step can be automated and can be scheduled as desired. For example, the backwash could occur for 10 minutes in every 12 hour period or every 24 hour period as needed.

Once the fixed bed 150 is saturated with iodine, valves 170, 172, 176, and 178 are closed. Valves 202, 174, and 180 are opened, and $SO_2$/water are run through the fixed bed 150 to remove the iodine through line 168. The $SO_2$/water can be provided through external feed 200.

The present disclosure has been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A process for recovering elemental iodine ($I_2$) from an aqueous solution containing iodine, comprising:
    transferring brine containing iodine to an electrolytic cell and a reactor;
    producing hypochlorite in the electrolytic cell from the brine;
    transferring the hypochlorite-containing brine from the electrolytic cell to the reactor;
    transferring an acid to the reactor, producing the aqueous solution containing iodine;
    exposing granular activated carbon particles to the aqueous solution to adsorb the iodine, wherein the activated carbon particles are in the form of a fixed bed, and are exposed to the aqueous solution by feeding the aqueous solution at a top of the fixed bed;
    exposing the iodine containing granular activated carbon particles to sulfur dioxide gas and water to form a reducing solution containing hydrogen iodide; and
    reacting the hydrogen iodide with an oxidant to obtain elemental iodine; and
    removing contaminants from the iodine containing granular activated carbon particles by a backwash step wherein the aqueous solution is periodically fed at a bottom of the fixed bed instead of at the top of the fixed bed, wherein iodine continues to be adsorbed during the backwash step.

2. The process of claim 1, wherein the granular activated carbon particles are granular activated coconut carbon particles.

3. The process of claim 1, wherein the activated carbon particles comprise micropores.

4. The process of claim 1, further comprising separating the elemental iodine from the reducing solution.

5. The process of claim 1, further comprising recycling the activated carbon particles after forming the reducing solution.

6. The process of claim 1, wherein the oxidant is hydrogen peroxide.

7. A process for recovering elemental iodine (12) from brine, comprising:
    electrolyzing brine in an electrolytic cell to produce brine containing hypochlorite;
    combining brine from a brine source, the brine containing hypochlorite, and an acid to produce brine containing elemental iodine;
    feeding the brine containing elemental iodine into a top of a fixed bed that contains granular activated coconut carbon particles to adsorb iodine in the brine;
    exposing the iodine containing granular activated coconut carbon particles to sulfur dioxide gas and water to form hydrogen iodide;
    oxidizing the hydrogen iodide with hydrogen peroxide to obtain elemental iodine; and
    periodically removing contaminants from the iodine containing granular activated carbon particles by a backwash step wherein the brine containing elemental iodine is fed at a bottom of the fixed bed instead of at the top of the fixed bed, wherein iodine continues to be adsorbed during the backwash step.

8. The process of claim 7, wherein the elemental iodine is in the form of crystals, and the process further comprises filtering out the iodine crystals.

9. The process of claim 1, wherein sulfuric acid is also formed in the reducing solution when the iodine containing granular activated carbon particles are exposed to sulfur dioxide gas and water; and the process further comprises the step of separating the sulfuric acid from the reducing solution containing hydrogen iodide and sulfuric acid by adding solid iodine to the reducing solution containing hydrogen iodide and sulfuric acid before the step of reacting the hydrogen iodide with the oxidant.

10. The process of claim 6, wherein the hydrogen peroxide is provided in an oxidizing solution which comprises from 35 to 50 wt % of hydrogen peroxide.

11. The process of claim 1, wherein exposing the iodine ion containing granular activated carbon particles to sulfur dioxide gas and water takes place at room temperature.

* * * * *